2,985,722
Patented May 23, 1961

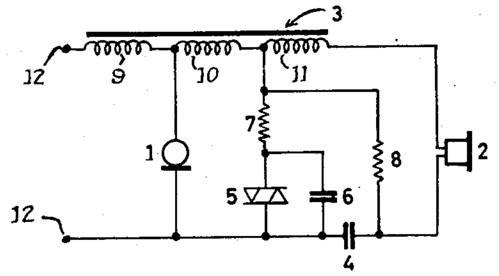
Inventor:
Karl Ernst Hoestermann
By [signature] Atty.

2,985,722

CIRCUIT ARRANGEMENT FOR AUTOMATICALLY REGULATING SIDE-TONE DAMPING OF TELEPHONE STATIONS

Karl-Ernst Hoestermann, Munich-Grosshadern, Germany, assignor to Siemens & Halske Aktiengesellschaft Berlin and Munich, a corporation of Germany Filed Dec. 20, 1956, Ser. No. 629,736

Claims priority, application Germany Dec. 30, 1955

2 Claims. (Cl. 179—81)

The present invention relates to a circuit arrangement for automatically regulating side-tone damping of telephone stations so as to obtain nearly complete compensation of the influence of different line lengths on the balancing conditions. Known telephone circuits for regulating side-tones are disclosed in German Patent No. 925,956, dated April 4, 1955, and in U.S. Patent No. 2,775,649, dated December 25, 1956, the latter of which describes the prior art in column 3, starting at line 36.

It is generally endeavored in connection with telephone stations of the anti-sidetone type to maintain the damping at an optimum, which means that the amount of the side-tone damping must not go below a minimum in order to avoid exerting a disturbing influence on the subscriber; on the other hand, a certain amount of the side-tone should be present during the talking in order to avoid giving the subscriber the impression that the station is entirely "dead." The required side-tone damping of telephones is in general increased by compensating or balancing networks of various types. In order to achieve optimum damping, it is necessary to tune the impedance of the balancing network so that the real and reactive components of this impedance are in a ratio determined by the repeater to the real and reactive components of the impedance of the subscriber line. Different lengths of the subscriber lines require balancing of the real and reactive components of the balancing network individually for each line length.

For this purpose it has already been proposed to use a balancing network comprising a non-linear or current-sensitive resistance element such as a dry rectifier connected in parallel with a capacitor. Since the feed voltage at the transmitter is also present on the balancing network, the resistance of the non-linear resistance element assumes a value corresponding to such voltage. However, the capacitor connected in parallel to the non-linear resistance element is thereby not maintained at the desired value corresponding to the length-dependent capacitive line component. In the case of a small capacitance of the capacitor sufficient side-tone damping can be obtained only in the case of short lines, while when a larger capacitance is used, the optimum side-tone damping can be obtained only with a correspondingly large line length.

The present invention affords the possibility of automatically regulating the side-tone damping for greatly varying lengths of the subscriber lines. This object is achieved by connecting in the complex balancing network impedance, in addition to the parallel connection of non-linear resistance element and a capacitor, an ohmic resistor which is connected in series thereto, thereby effecting in the balancing network a regulation of the side-tone damping which is true to actual conditions even in the case of short line lengths. In the case of short line lengths, the capacitive component which is to be balanced is small. The reproduction of this component is effected in the parallel circuit of a non-linear resistance element and the capacitor. The ohmic component of the balancing network which is required even in case of extremely short line lengths is obtained in all cases by the ohmic resistor connected in series with the parallel circuit.

An embodiment of the invention is shown by way of example in the drawing. Details not necessary for an understanding of the arrangement according to the invention have been omitted in the drawing.

Referring now to the drawing, numeral 1 indicates the transmitter, numeral 2 the receiver and numeral 3 the customary multiple winding induction coil having the windings 9, 10 and 11. Numeral 12 indicates the terminals of the line conductors of the station circuit which are connected to an exchange. The capacitor 4 blocks in known manner direct current relative to the receiver 2.

The transmitter 1 and the receiver 2 are connected in a balancing and anti-sidetone circuit arrangement by means of the windings 10 and 11 of the induction coil 3. The balancing and anti-sidetone arrangement comprises the resistor 8 which is in customary manner connected in parallel to the receiver 2 over the winding 11 of the induction coil 3, and a series circuit including an ohmic resistor 7 and a non-linear resistance element 5 connected in parallel with a capacitor 6, such series circuit being connected across the line conductors in parallel with the transmitter 1 over winding 10 of the induction coil. The non-linear resistance element 5 may be a dry rectifier or if desired two oppositely polarized dry rectifiers or a varistor and the like. In case of short line lengths, the resistance of the element 5 drops very rapidly and the element forms a shunt for the capacitor 6. The value of the resistance necessary for this condition is restored again by the series-connected resistor 7 and thus brings the total impedance of the series circuit back to the desired relationship with respect to the impedance of the subscriber's line. With an increase in the line length, the resistance of element 5 increases relatively greatly and in this way cancels the shunt existing for the capacitor 6 so that the capacitive component of the balancing network becomes active corresponding to the increase in length of the line.

The use of the resistor 7 in series with the resistance element 5 thus maintains the capacitive component low, faithful to actual conditions, in case of short line lengths.

The invention may be employed in all cases in which the best possible compensation of the side-tone damping is desired in the case of greatly varying line lengths.

Changes may be made within the scope and spirit of the appended claims.

I claim:

1. In a telephone station, a transmitter and receiver each having a connection to a common terminal and each having a connection to spaced terminals of an induction coil, aside-tone balancing network comprising a non-linear resistance element having a capacitor connected in parallel therewith and an ohmic resistance connected in series with said parallel-connected element and capacitor, said balancing network being connected to said common terminal and to a terminal intermediate said spaced terminals.

2. The combination according to claim 1, comprising a further resistor having a connection to said common terminal and a connection to said intermediate terminal.

References Cited in the file of this patent

UNITED STATES PATENTS

| | | |
|---|---|---|
| 2,589,800 | Goodale et al. | Mar. 18, 1952 |
| 2,629,783 | Hopkins | Feb. 24, 1953 |
| 2,732,436 | Aikens et al. | Jan. 24, 1956 |
| 2,801,288 | Meacham | July 30, 1957 |

FOREIGN PATENTS

| | | |
|---|---|---|
| 671,784 | Great Britain | May 7, 1952 |